US009461753B2

(12) United States Patent
Takeuchi et al.

(10) Patent No.: US 9,461,753 B2
(45) Date of Patent: Oct. 4, 2016

(54) OPTICAL RECEIVER CIRCUIT

(71) Applicant: FUJITSU OPTICAL COMPONENTS LIMITED, Kawasaki-shi, Kanagawa (JP)

(72) Inventors: Shintaro Takeuchi, Sapporo (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/607,576

(22) Filed: Jan. 28, 2015

(65) Prior Publication Data

US 2015/0139667 A1    May 21, 2015

Related U.S. Application Data

(63) Continuation of application No. PCT/JP2012/069365, filed on Jul. 30, 2012.

(51) Int. Cl.
*H04B 10/61* (2013.01)
*G02F 1/225* (2006.01)
*G02F 1/01* (2006.01)
*H04B 10/25* (2013.01)

(52) U.S. Cl.
CPC ........... *H04B 10/613* (2013.01); *G02F 1/0147* (2013.01); *G02F 1/225* (2013.01); *H04B 10/25* (2013.01); *H04B 10/611* (2013.01); *H04B 10/614* (2013.01); *H04B 10/6162* (2013.01); *G02F 2203/48* (2013.01)

(58) Field of Classification Search
CPC .................................................. H04B 10/611
See application file for complete search history.

(56) References Cited

U.S. PATENT DOCUMENTS

| 7,200,296 | B2 | 4/2007 | Kish, Jr. et al. | |
|---|---|---|---|---|
| 2007/0086017 | A1* | 4/2007 | Buckland | A61B 3/102 356/497 |
| 2008/0031566 | A1 | 2/2008 | Matsubara et al. | |
| 2010/0054761 | A1* | 3/2010 | Chen | H04B 10/60 398/212 |
| 2010/0178065 | A1* | 7/2010 | Nishihara | H04B 10/61 398/202 |
| 2010/0245837 | A1 | 9/2010 | Yamamoto | |

(Continued)

FOREIGN PATENT DOCUMENTS

| GB | 2385731 A * | 8/2003 | H04B 10/08 |
|---|---|---|---|
| JP | 5-232520 | 9/1993 | |
| JP | 8-184788 | 7/1996 | |

(Continued)

OTHER PUBLICATIONS

Matiss et al., "Performance of an Integrated Coherent Receiver Module for up to 160G DP-QPSK Transmission Systems", *Journal of Lightwave Technology*, Apr. 1, 2011, pp. 1026-1032, vol. 29, No. 7.

(Continued)

*Primary Examiner* — Nathan Curs
(74) *Attorney, Agent, or Firm* — Staas & Halsey LLP

(57) ABSTRACT

An optical receiver circuit includes a polarization beam splitter configured to split input signal light into two different polarized wave components; two variable optical attenuators configured to respectively adjust attenuation of and output the signal light split by the polarization beam splitter according to polarization state; and a single planar optical waveguide on which the polarization beam splitter and the two variable optical attenuators are disposed.

9 Claims, 11 Drawing Sheets

(56) References Cited

U.S. PATENT DOCUMENTS

2012/0207474 A1    8/2012  Inoue et al.
2013/0286847 A1*  10/2013  Schmidt .............. H04J 14/0276
                                                          370/241

FOREIGN PATENT DOCUMENTS

| JP | 2003-121806 | 4/2003 |
| JP | 2005-181583 | 7/2005 |
| JP | 2010-237300 | 10/2010 |
| JP | 2011-197700 | 10/2011 |
| JP | 2012-50140 | 3/2012 |
| WO | WO 2006/013928 A1 | 2/2006 |
| WO | WO 2011/027895 A1 | 3/2011 |

OTHER PUBLICATIONS

International Search Report mailed Nov. 13, 2012, in corresponding International Patent Application No. PCT/JP2012/069365.

Written Opinion of the International Search Authority mailed Nov. 13, 2012, in corresponding International Patent Application No. PCT/JP2012/069365.

Japanese Office Action dated Dec. 15, 2015 in corresponding Japanese Patent Application No. 2014-527842.

Kawanishi et al., "High Extinction Ratio Optical Modulator Using Active Intensity Trimmers", ECOC 2005 Proceedings—vol. 4 Paper Th 1.6.6, pp. 841-842.

Extended European Search Report dated Mar. 24, 2016 in corresponding European Patent Application No. 12882009.9.

\* cited by examiner

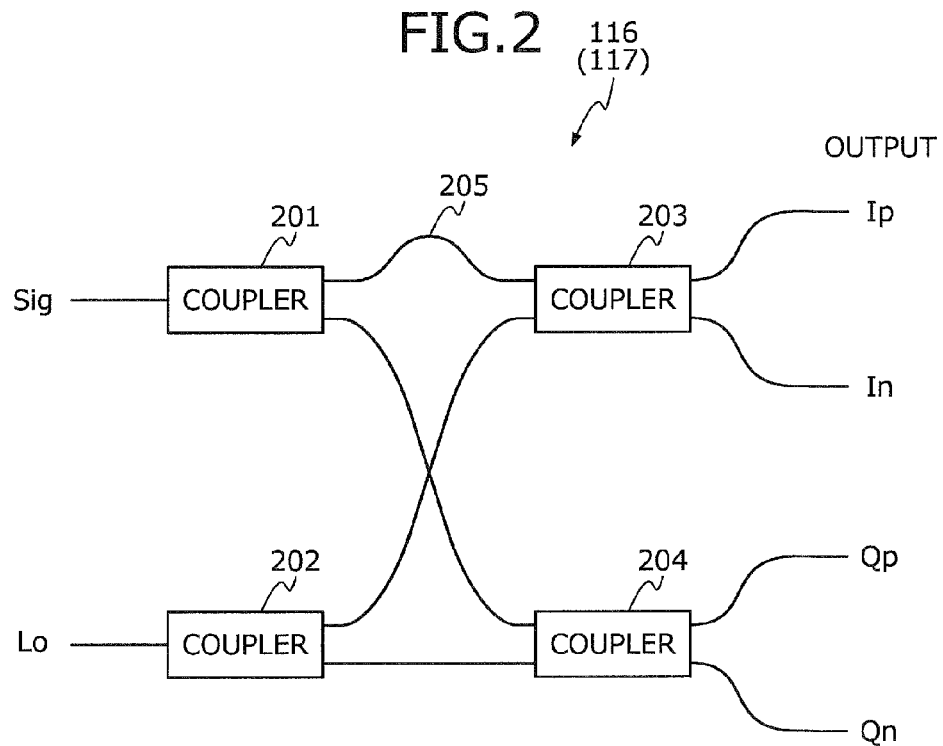
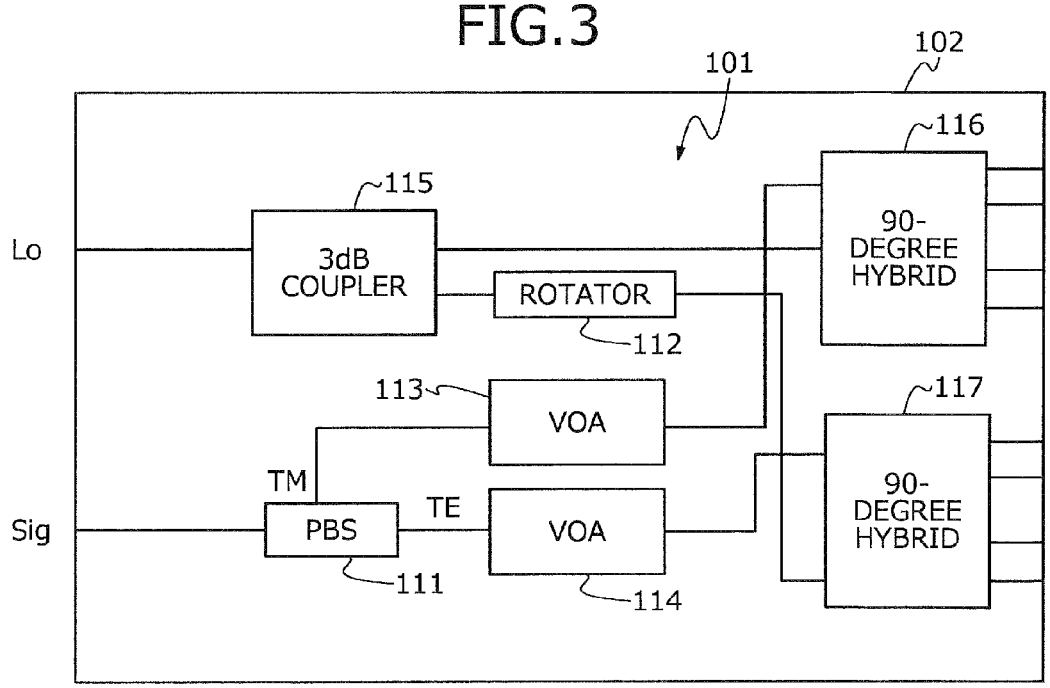

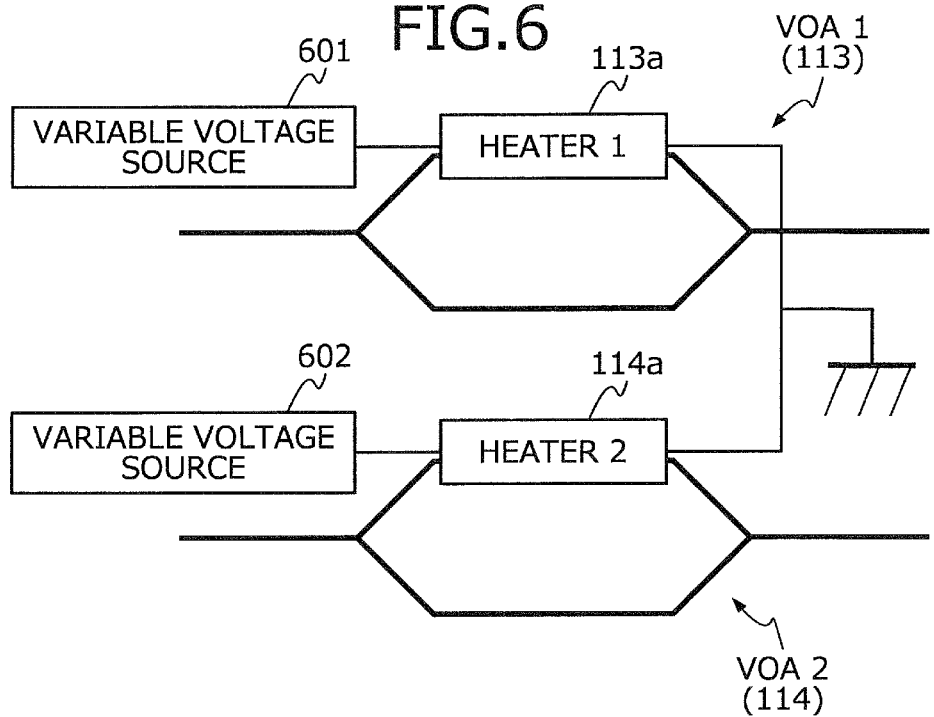
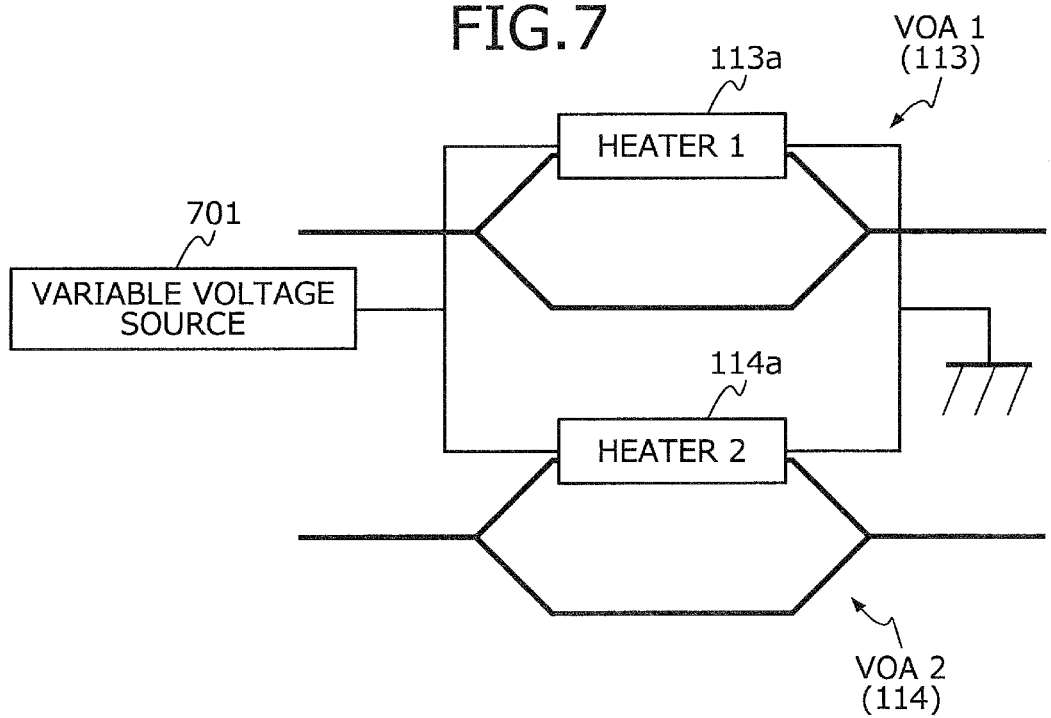

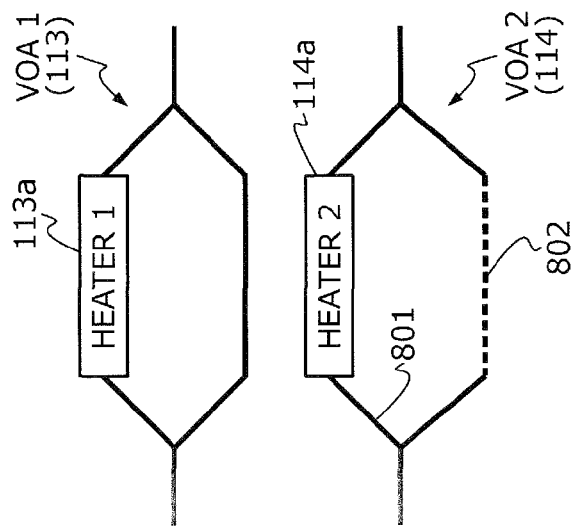
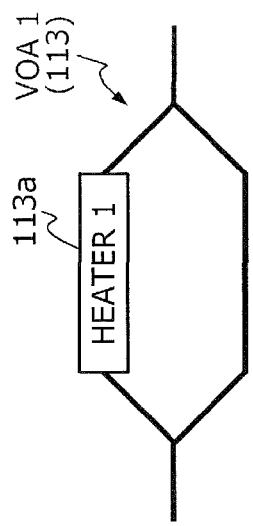
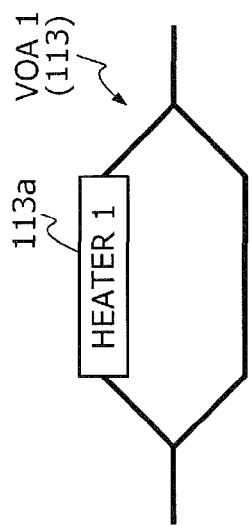

OPTICAL RECEIVER CIRCUIT

CROSS REFERENCE TO RELATED APPLICATIONS

This application is a continuation application of International Application PCT/JP2012/069365, filed on Jul. 30, 2012, and designating the U.S., the entire contents of which are incorporated herein by reference.

FIELD

The embodiments discussed herein relate to an optical receiver circuit used in an optical transmission system and whose functions are integrated on a planar optical waveguide.

BACKGROUND

In optical transmission systems, optical phase modulation schemes that realize large capacities without deterioration at the time of transmission have recently gained attention. In particular, standardization by the Optical Internetworking Forum (OIF) is advancing for the scheme of Dual Polarization Differential Quadrature Phase Shift Keying (DP-QPSK), and this scheme will become a major scheme in the future.

A DP-QPSK optical demodulation circuit splits the polarization of a polarization-multiplexed optical phase-modulated signal (Sig) by a polarization beam splitter (PBS); causes, in a 90-degree hybrid circuit, the signal light of each polarization to interfere with local light (Lo) of a substantially equivalent optical frequency and that has not been modulated; and demodulates phase signals by differential reception into intensity signals. The 90-degree hybrid circuit sets the phase angle of the delay line to 90 degrees; a coupler is disposed respectively for an input optical phase modulated signal (signal light) and local light; and the phase rotation angle of the couplers is 90 degrees. Consequently, the amplitude of the local light is made larger and the amplitude of the signal light can be increased. Configuration of this 90-degree hybrid circuit requires accurate determination of the phase relationship of the light and the use of a planar optical waveguide (planar light-wave circuit (PLC)) that can be fabricated with precision is suitable.

To reduce device size and device cost under a DP-QPSK scheme, on the PLC, integration of a variable optical attenuator (VOA) that adjusts the attenuation of the signal light is demanded.

In the DP-QPSK scheme, integration of VOA on the PLC is demanded to reduce device size and device cost. Typically, the VOA is mounted before the polarization beam splitter (PBS). In this case, the problem that arises is a difference in attenuation consequent to polarization dependent loss (PDL) of the signal light split by the polarization beam splitter. The signal light transmitted by the polarization beam splitter is split into a TE wave and a TM wave, whose polarized light differs by 90 degrees. Since the refractive index in the waveguide differs, for light waves of polarized light that differ, a difference in the amount that each is attenuated arises. An example of performing optical attenuation by a VOA on input light that has been split by a polarization beam splitter (PBS) and control of PDL has been disclosed (for example, refer to Japanese Laid-open Patent Publication No. 2011-197700).

In a configuration where input light that has been split by a polarization beam splitter (PBS) and thereafter, is optically attenuated by a VOA, one component of the input light that has been transmitted through a circulator is TE polarized light that after being input to the VOA is transmitted by a half-wave plate, becoming TM polarized light and the other component is transmitted through the VOA after being transmitted by a half-wave plate and becoming TE polarized light from TM polarized light. Subsequently, the TM polarized light and TE polarized light are coupled by the circulator and output. At the time of transmission through the VOA, each of the split components of the input light is a TE wave and therefore, PDL does not occur. Nonetheless, with this configuration, since the split components of the input light are again coupled and output, this configuration is not applicable to schemes used on the respective output of the two split DP-QPSK light waves.

SUMMARY

According to an aspect of an embodiment, an optical receiver circuit includes a polarization beam splitter configured to split input signal light into two different polarized wave components; two variable optical attenuators configured to respectively adjust attenuation of and output the signal light split by the polarization beam splitter according to polarization state; and a single planar optical waveguide on which the polarization beam splitter and the two variable optical attenuators are disposed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting a structural example of a 90-degree hybrid circuit disposed in the optical receiver circuit;

FIG. 3 is a diagram depicting a second structural example of the optical receiver circuit according to the embodiment;

FIG. 6 is a diagram depicting a structural example for controlling two VOAs by independent power sources;

FIG. 7 is a diagram depicting a structural example for controlling the two VOAs by a single power source;

FIGS. 8A, 8B, and 8C are diagrams depicting a structural example of the VOAs in a case of control by a single power source;

DESCRIPTION OF EMBODIMENTS

Figure 1:
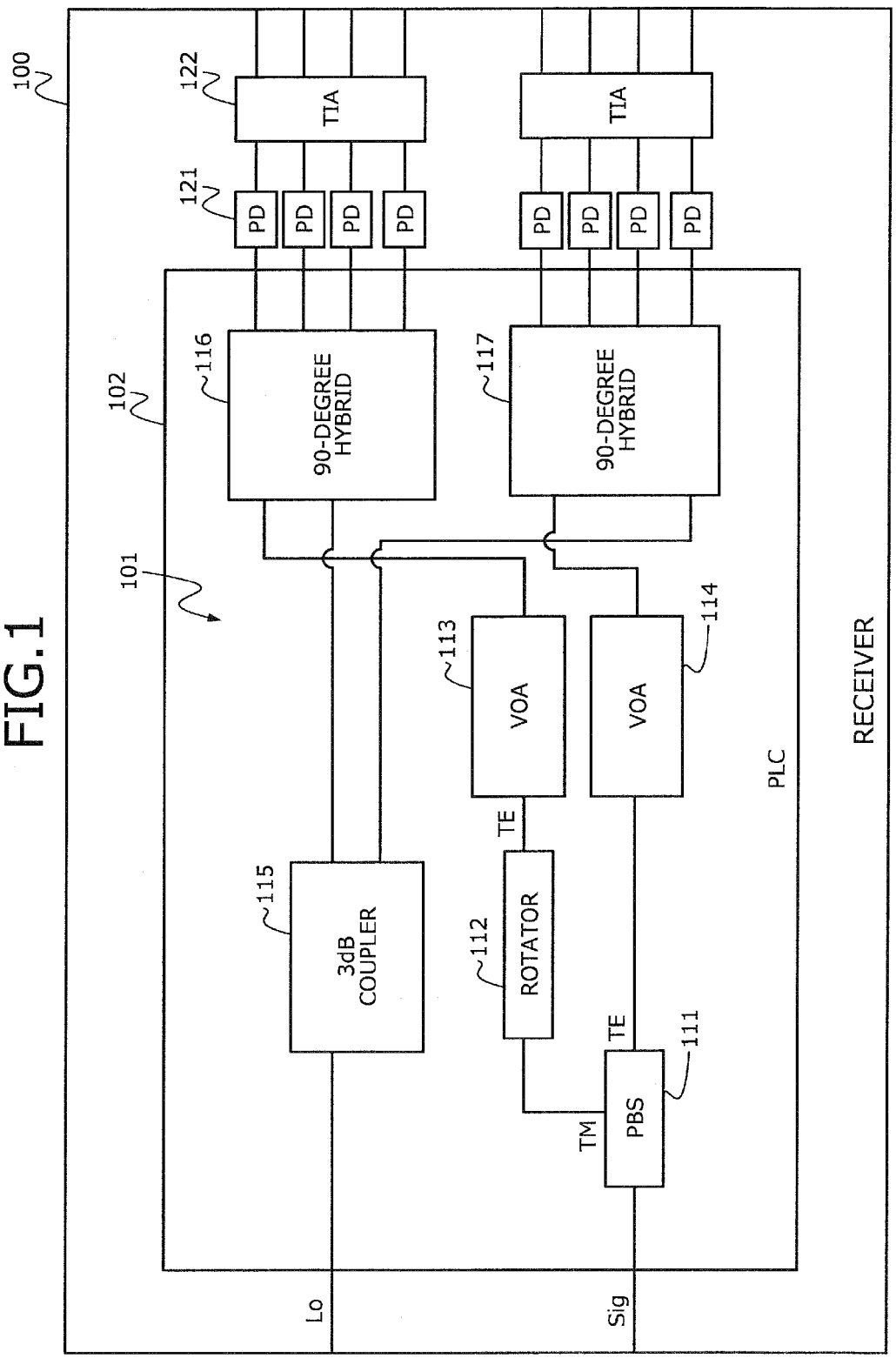
FIG. 1 is a diagram depicting a first structural example of an optical receiver circuit according to an embodiment.

An embodiment of the disclosed technology will be described in detail with reference to the accompanying drawings. FIG. 1 is a diagram depicting a first structural example of an optical receiver circuit according to the embodiment. In the present embodiment, a DP-QPSK optical demodulation circuit used under a DP-QPSK scheme will be described as an example of the optical demodulation circuit.

An optical receiver circuit 100 includes an optical demodulation circuit 101 and plural PDs 121 and TIAs 122 disposed downstream from the optical demodulation circuit 101.

The optical demodulation circuit 101 depicted in FIG. 1 is a DP-QPSK optical demodulation circuit used under a DP-QPSK scheme. The optical demodulation circuit 101 includes a polarization beam splitter (PBS) 111, a half-wave plate (rotator) 112, variable optical attenuators (VOA) 113, 114, 3 dB coupler (splitter-coupler) 115, and 90-degree hybrid circuits 116, 117. These optical demodulation circuits 101 are disposed on a single planar optical waveguide (PLC) 102. Thus, the variable optical attenuator function by the VOAs 113, 114 is integrated on the planar optical waveguide (PLC) 102, whereby the optical demodulation circuit 101 and the optical receiver circuit 100 can be fabricated to be compact, having high precision and a low cost.

The 3 dB coupler 115 of the optical demodulation circuit 101 receives an input of local light (Lo), splits the local light (Lo) and outputs the resulting light respectively to the two 90-degree hybrid circuits 116, 117. The polarization beam splitter (PBS) 111 receives input of polarization-multiplexed optical phase-modulated signal (signal light, Sig) and polarization splits the signal light into a TM wave and a TE wave.

Downstream from the polarization beam splitter (PBS) 111, on one signal component (e.g., indicated as TM wave) side, the half-wave plate (rotator) 112 is disposed. The polarized wave state of this TM wave is converted into a TE wave. Downstream from the polarization beam splitter (PBS) 111 and downstream from the half-wave plate (rotator) 112, the variable optical attenuators (VOA) 113, 114 are disposed, respectively.

The VOAs 113, 114 receive input of the signal light that has been split by the PBS 111 and is in a state in which the polarized state of each signal light component is the same. The VOAs 113, 114 adjust the attenuation of the respective signal light components split by the PBS 111 and output the attenuated signal light components to the 90-degree hybrid circuits 116, 117.

FIG. 2 is a diagram depicting a structural example of a 90-degree hybrid circuit disposed in the optical receiver circuit. The 90-degree hybrid circuits 116, 117 use the input signal light (Sig) and the local light (Lo) whose optical frequency is substantially equivalent and that has not been modulated, to increase the amplitude of the signal light (Sig) and output the resulting light. Two upstream couplers 201, 202 respectively split the signal light (Sig) and the local light (Lo) into two branches and output the branches to each downstream coupler 203, 204, in a crossover manner. On the signal light (Sig) side, a delay line 205 is disposed. The phase angle of the delay line 205 is 90 degrees and the phase rotation angle of the couplers 203, 204 is 90 degrees. As a result, the amplitude of the local light (Lo) is made larger and signal light (Ip, In, Qp, Qn) for which the amplitude has been increased is output.

The reference of description returns to FIG. 1. The output of the 90-degree hybrid circuits 116, 117, i.e., the signal light demodulated by the DP-QPSK optical demodulation circuit 101, is detected by a photosensitive element (photo detector (PD)) 121 and converted into an analog electronic signal. The electronic signal output by the photosensitive element 121 is amplified by a transimpedance amplifier (TIA) 122. Although not depicted, output of the transimpedance amplifier (TIA) 122 is converted into a digital signal by an analog/digital converter (ADC) and output.

FIG. 3 is a diagram depicting a second structural example of the optical receiver circuit according to the embodiment. In FIG. 3, the structure of the optical demodulation circuit 101 has been extracted and differs from the first structural example (refer to FIG. 1) in that, unlike the first structural example, the half-wave plate 112 is not disposed after the PBS 111. The VOAs 113, 114 optically attenuate signal light that has been split by the polarization beam splitter into 2 components of differing polarized states (e.g., TE wave and TM wave).

In the structural example depicted in FIG. 3, at one of the branch outputs of the 3 dB coupler 115, the half-wave plate (rotator) 112 is disposed and signal light (Sig) components whose polarized state differs by 90 degrees are input to the 90-degree hybrid circuits 116, 117. According to the structural example depicted in FIG. 3, the half-wave plate 112 is disposed on the local light (Lo) side, not on the signal light (Sig) side, and signal light (Sig) loss consequent to transmission through the half-wave plate 112 can be prevented.

Principles of optical attenuation using the variable optical attenuators (VOA) 113, 114 will be described. The attenuation of the signal light components (TE wave, TM wave) split by the PBS 111 is respectively adjusted by the separate VOAs 113, 114. Typically, light wave power can be expressed by equation (1).

$$P_0 = F \sin^2 \theta \qquad (1)$$

Where, F is the light wave amplitude and θ is the phase. When $P_0=F$, attenuation is 0 dB. By representing the power of a thin film heater disposed in the VOAs 113, 114 as a parameter, θ can be expressed by equation (2).

$$\theta = kP_e + \delta\Phi \qquad (2)$$

Where, k is a phase shift coefficient corresponding to the heater power, Pe is the heater power, and δΦ is the initial phase of the arm waveguide. k and δΦ are determined according to the structure and refractive index of the waveguide.

Figure 4:
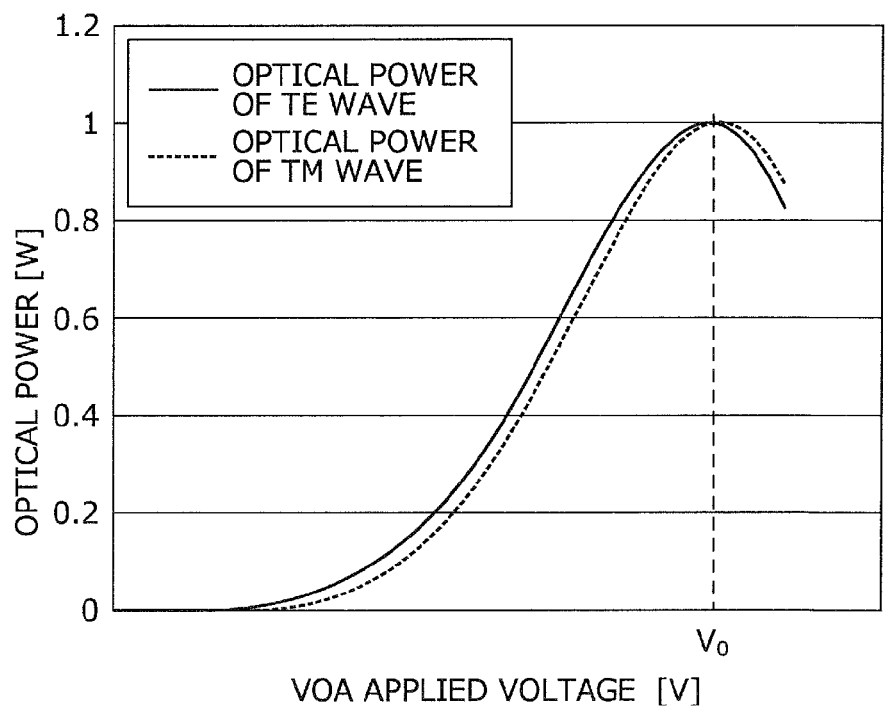
FIG. 4 is a diagram depicting optical power differences of a TE wave and a TM wave consequent to PDL.
Figure 5:
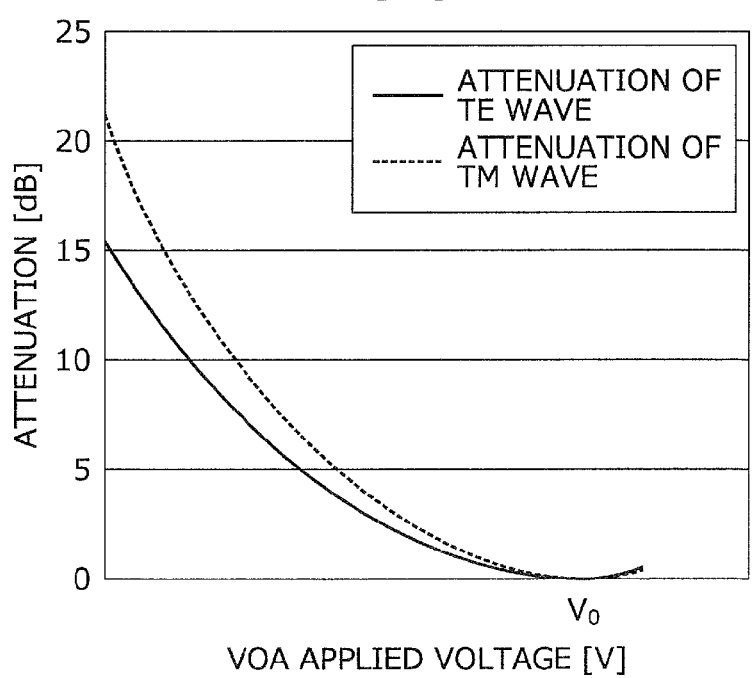
FIG. 5 is a diagram depicting attenuation differences of the TE wave and the TM wave consequent to PDL.

FIG. 4 is a diagram depicting optical power differences of the TE wave and the TM wave consequent to PDL. FIG. 5 is a diagram depicting attenuation differences of the TE wave and the TM wave consequent to PDL. The horizontal axes of FIGS. 4 and 5 indicate the voltage applied to the VOA. As depicted, even when the same voltage is applied to the VOAs, if the polarized state differs, the optical power and the attenuation differ consequent to polarization dependent loss (PDL).

If the half-wave plate 112 is disposed after the PBS 111 as in the second structural example (refer to FIG. 3) of the optical demodulation circuit 101, to make the attenuation of the two signal light components (TE wave, TM wave) split by the PBS 111 coincide, different optical attenuation adjustment is performed for the respective signal light components. Since the refractive index differs in the waveguide, the values of k and δΦ for the TE wave and the TM wave also differ consequent to polarized wave dependency of the signal light. In other words, to make the attenuation of the TE wave and the TM wave coincide, the relationship expressed by equation (3) has to be satisfied.

$$k_{TE}P_e + \delta\Phi_{TE} = k_{TM}P'_e + \delta\Phi_{TM} \quad (3)$$

There are 2 methods of making the amount of attenuation of the TE wave and the TM wave coincide.

(1) Method of Controlling 2 VOAs by Differing Electrical Power.

The first method provides differing electrical power to the VOA 113 and the VOA 114 to satisfy equation (3).

FIG. 6 is a diagram depicting a structural example for controlling the two VOAs by independent power sources. A VOA 1(113) and a VOA 2(114) are fabricated by the same design and by using two independent variable voltage sources 601, 602, different voltages are applied to a heater 1(113a) of the VOA 1(113) and a heater 2(114a) of the VOA 2(114) such that equation (3) is satisfied.

(2) Method of Controlling 2 VOAs Using Single Power Source and Changing Optical Path Length of Arm Waveguide The second method changes the optical path length of the arm waveguides of the two VOAs 113, 114 to thereby, satisfy equation (3) at the same voltage.

FIG. 7 is a diagram depicting a structural example for controlling the two VOAs by a single power source. A VOA 1(113) and a VOA 2(114) are fabricated by the same design and by using a single variable voltage source 701, the same voltage is applied to the VOA 1(113) and the VOA 2(114) to control the VOA 1(113) and the VOA 2(114). However, when the attenuation of the two VOAs, VOA 1(113) and VOA 2(114) 1, is adjusted by a single variable voltage source 701, consideration of fabrication differences of the two VOAs, VOA 1(113) and VOA 2(114) is necessary. A countermeasure for eliminating attenuation differences between the two VOAs consequent to fabrication differences will be described hereinafter.

FIGS. 8A, 8B, and 8C are diagrams depicting a structural example of the VOAs in a case of control by a single power source. In the second method, as depicted by FIGS. 8A, 8B, and 8C, respectively, VOA designs for satisfying equation (3) include arm length asymmetrization of the waveguides of the VOA 1(113) and the VOA 2(114); arm width asymmetrization of the waveguides; refractive index asymmetrization of the waveguides by UV irradiation. In the example depicted in FIG. 8A, the waveguide length of an arm waveguide 802 is designed to be longer than that of an arm waveguide 801. In the example depicted in FIG. 8B, the width of the arm waveguide 802 is designed to be greater than the width of the waveguide 801. In the example depicted in FIG. 8C, the refractive index of the arm waveguide 802 is designed to be less (or greater) than the refractive index of the arm waveguide 801. As described, even when the two VOAs 113, 114 are controlled by a single power source, by changing the optical path lengths of the arm waveguides of the two VOAs 113, 114, differences in the attenuation of the TE wave and TM wave consequent to PDL (refer to FIG. 5) can be eliminated.

Specific examples of the present invention will be described. As described above, attenuation control methods can be roughly divided into two types: controlling two VOAs by independent variable voltage sources "specification of 2 variable power sources"; and controlling two VOAs by a single variable voltage source "specification of 1 variable power source". With the specification of 2 variable power sources, fabrication differences of the two VOAs (details described hereinafter) are included and by detecting the output light attenuated by the two VOAs and performing feedback control of the attenuation of the VOAs, the attenuation can be caused to coincide with precision. With this specification of 2 variable power sources, a control unit (not depicted) uses a photo detection element (PD, etc.) to monitor the levels of input light and output light and performs feedback control such that there are no differences in the attenuation of the two VOAs caused by PDL. On the other hand, with the specification of 1 variable power source, fabrication differences of the two VOAs are preliminarily measured and processing required for correction thereof is performed, whereby attenuation differences consequent to fabrication differences of the VOAs is controlled. With the specification of 1 variable power source, the control unit suffices to perform control of applying to the VOAs, voltage that corresponds to the required amount of attenuation.

In a first example, the first structural example (refer to FIG. 1) is controlled by the specification of 2 variable power sources (refer to FIG. 6). In the first example, since the half-wave plate 112 is used for one of the components of the signal light split by the PBS 111, the signal light input to the two VOAs 113, 114 is the same, either the TE wave or the TM wave (in the example depicted in FIG. 1, the TE wave). The voltage applied to the respective VOAs 113, 114 is independently adjusted by the two independent variable voltage sources 601, 602 (refer to FIG. 6), the attenuation of the two components of signal light that has been split is made to coincide, and the two components are output to the 90-degree hybrid circuits 116, 117.

In a second example, the first structural example (refer to FIG. 1) is controlled by the specification of 1 variable power source (refer to FIG. 7). In the second example, since the half-wave plate 112 is used for one of the components of the signal light split by the PBS 111 depicted in the first structural example (refer to FIG. 1), the signal light input to the two VOAs 113, 114 is the same, either the TE wave or the TM wave (in the example depicted in FIG. 1, the TE wave). Therefore, the two VOAs 113, 114 suffice to use the same design and to receive application of the same voltage by the single variable voltage source 701 (refer to FIG. 7). The control by the single variable voltage source 701 has the advantage of being easier than control that uses two variable voltage sources.

In this regard, this can be used when there are no fabrication differences between the two VOAs 113, 114. In actuality, to obtain a given amount of attenuation between the two VOAs 113, 114, a difference in the voltage required to be applied may occur consequent to fabrication differences of the VOAs 113, 114. "1. Thin film heater resistance error" and "2. Optical path length error of arm waveguide" may occur as fabrication differences of the VOAs 113, 114. A technique of correcting these two types of fabrication differences will be described.

(Correction of 1. Thin Film Heater Resistance Error)

The optical VOA, for example, as depicted in FIG. 7, has the thin film heaters 113a, 114a on an arm waveguide and by supplying electricity to the thin film heaters 113a, 114a, heat is generated in the arm waveguide, whereby the refractive index is changed. With this, the attenuation of the light waves transmitted through the VOAs 113, 114 is adjusted. In this example, there is a fabrication difference in the resistance of the thin film heaters 113a, 114a. The power Ph to be supplied to the thin film heater (113a, 114a) is expressed by equation (4), where Vh is the voltage applied to the thin film heaters 113a, 114a and Rh is the resistance of the thin film heater 113a, 114a.

$$P_h = V_h^2 / R_h \quad (4)$$

In other words, even if the voltage Vh applied to the thin film heaters 113a, 114a of the two VOAs 113, 114 is the same, if Rh differs, a difference in Ph occurs and as a result, a difference in attenuation occurs.

Figure 9:
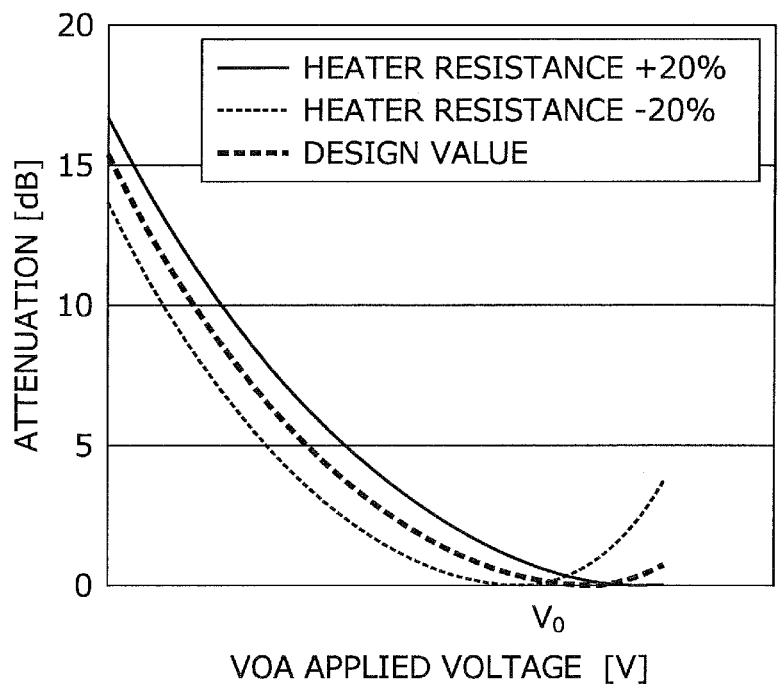
FIG. 9 is a graph depicting attenuation characteristics caused by differences in the resistance of thin film heaters.

FIG. 9 is a graph depicting attenuation characteristics caused by differences in the resistance of the thin film heaters. Design values (error ±0%) are indicated by a thick dashed line; characteristics for a resistance error of −20% are indicated by dotted line; and characteristics for a resistance error of +20% are indicated by a solid line.

Figure 10:
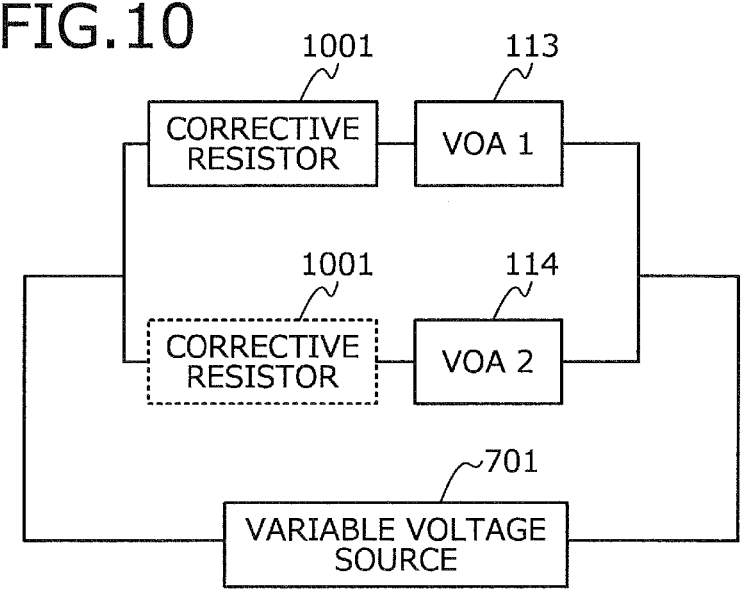
FIG. 10 is a diagram depicting an example of a configuration having a corrective resistor to prevent effects caused by resistance error of the thin film heaters.

FIG. 10 is a diagram depicting an example of a configuration having a corrective resistor to prevent effects caused by resistance error of the thin film heaters. To prevent resistance error of the thin film heaters 113a, 114a above, a resistor (corrective resistor) 1001 is inserted between one of the VOAs (in the example depicted in FIG. 10, VOA 1(113)) and the variable voltage source 701. Although described hereinafter, the corrective resistor 1001 is assumed to be of a structure that enables selection of various resistances within a range from no resistance (0Ω) to a given resistance, whereby as depicted by the dotted line in FIG. 10, the corrective resistor 1001 can also be preliminarily disposed between the other VOA 2(114) and the variable voltage source 701.

The power to be supplied to the thin film heater 113a (114a) of the VOA 113(114) having the corrective resistor 1001 is expressed by equation (5), where V0 is the voltage of the variable voltage source 701; r is the resistance of the corrective resistor 1001; and I is the current.

$$P_h = R_h I^2 = R_h \left(\frac{V_0}{R_h + r}\right)^2 \quad (5)$$

Adjustment is performed such that the power Ph supplied by the corrective resistor 1001, to the thin film heaters 113a, 114a of the two VOAs 113, 114 is equivalent. This adjustment is performed at the discrete device fabrication of the optical receiver circuit 100 and therefore, a structure is prepared that preliminarily enables selection of resistance values as the corrective resistor 1001.

Figure 11:
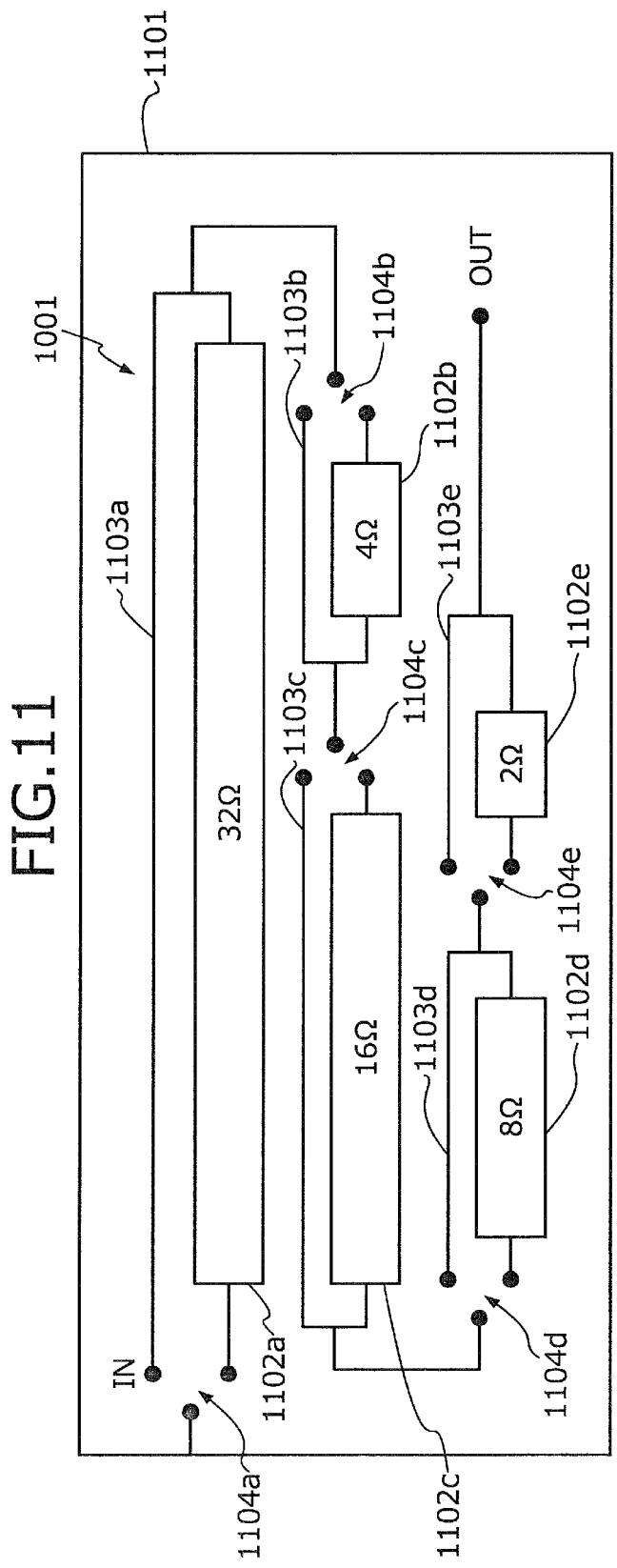
FIG. 11 is a diagram depicting a structural example of the corrective resistor.

FIG. 11 is a diagram depicting a structural example of the corrective resistor. In the example depicted in FIG. 11, the corrective resistor 1001 is formed on a substrate 1101 by a thin film. The corrective resistor 1001 includes the resistor elements 1102a to 1102e of various resistances (32Ω to 2Ω), diversion paths (connection paths for unused resistor elements) 1103a to 1103e disposed in parallel with the resistor elements 1102a to 1102e, and junction areas 1104a to 1104e disposed between the resistor elements 1102a to 1102e. The resistor elements 1102a to 1102e having the desired resistance r of the corrective resistor 1001 are selected and connected by wire bonding of the junction areas 1104a to 1104e. According to the structural example depicted in FIG. 11, the resistance can be set from 0Ω to 62Ω in 2Ω increments.

Figure 12:
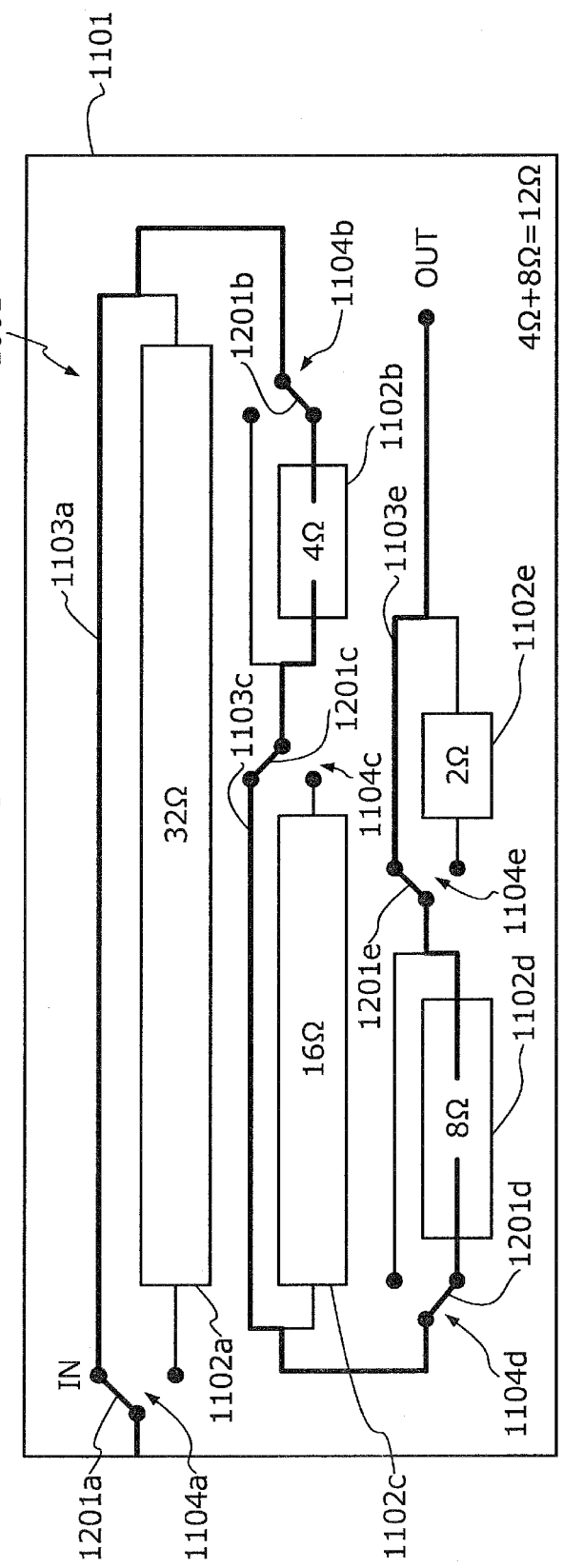
FIG. 12 is a diagram depicting a selection example of the corrective resistor.

FIG. 12 is a diagram depicting a selection example of the corrective resistor. In FIG. 12, an example in which 12Ω has been set is depicted, where the 4Ω resistor element 1102b and the 8Ω resistor element 1102d are selected. For the other resistor elements, the diversion paths 1103a, 1103c, 1103e are selected. Therefore, in the junction area 1104a, a wire 1201a connects the diversion path 1103a and in the junction area 1104b, a wire 1201b connects the resistor element 1102b. In the junction area 1104c, a wire 1201c connects the diversion path 1103c and in the junction area 1104d, a wire 1201d connects the resistor element 1102d. In the junction area 1104e, a wire 1201e connects the diversion path 1103e.

Figure 13B:
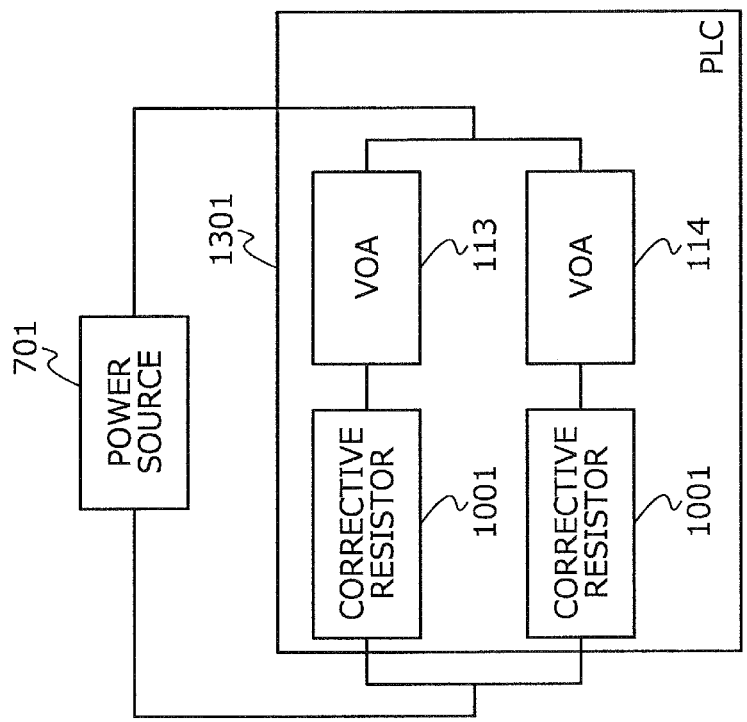
FIGS. 13A and 13B are diagrams describing an arrangement state of the corrective resistor.
Figure 13A:
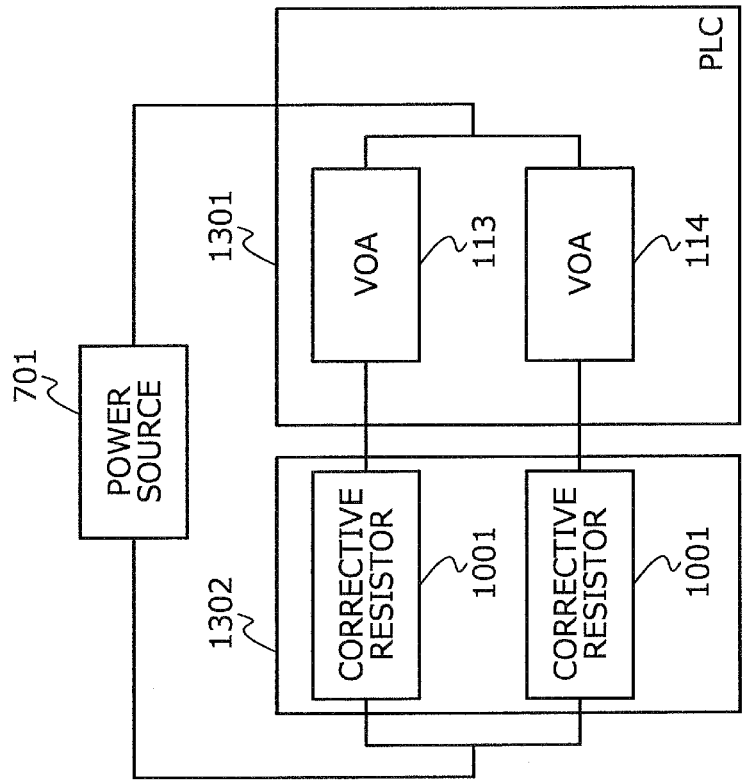

FIGS. 13A and 13B are diagrams describing an arrangement state of the corrective resistor. In FIG. 13A, a structural example in which the corrective resistor 1001 is disposed on a PLC substrate 1301 having the optical demodulation circuit 101 of FIG. 1 is depicted. In FIG. 13B, a structural example in which the corrective resistor 1001 is disposed on another substrate 1302 external to the PLC substrate 1301. As depicted in FIG. 13A, by disposing the corrective resistor 1001 on the PLC substrate 1301, the device can be made smaller. On the other hand, since the corrective resistor 1001 is disposed on the same substrate as the optical demodulation circuit 101, if the heat generated between the optical demodulation circuit 101 and the corrective resistor 1001 will become a problem, as depicted in FIG. 13B, the corrective resistor 1001 may be disposed on the other substrate 1302.

(Correction of 2. Optical Path Length Error of Arm Waveguide)

The other factor that can be considered a fabrication difference of the VOA is error in the optical path length of arm waveguides. If the optical path length of the arm waveguide differs from the design value, a difference arises in the refractive index that the light wave transmitted through the VOA is exposed to.

Figure 14:
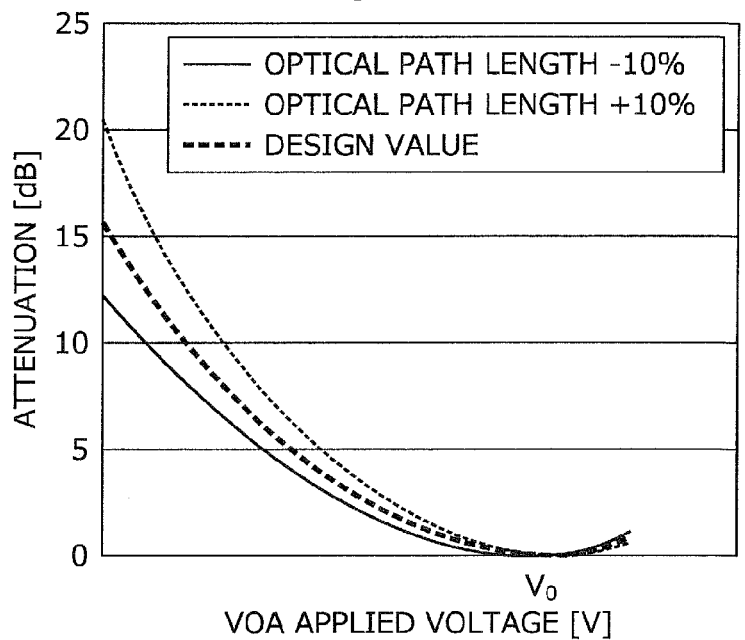
FIG. 14 is a graph depicting attenuation characteristics caused by fabrication differences in arm waveguides.

FIG. 14 is a graph depicting attenuation characteristics caused by fabrication differences in the arm waveguides. Characteristics for the design value (±0%) are indicated by a thick dashed line; characteristics for a +10% optical path length error are indicated by a dotted line; and characteristics for a −10% optical path length error are indicated by a solid line.

Figure 15:
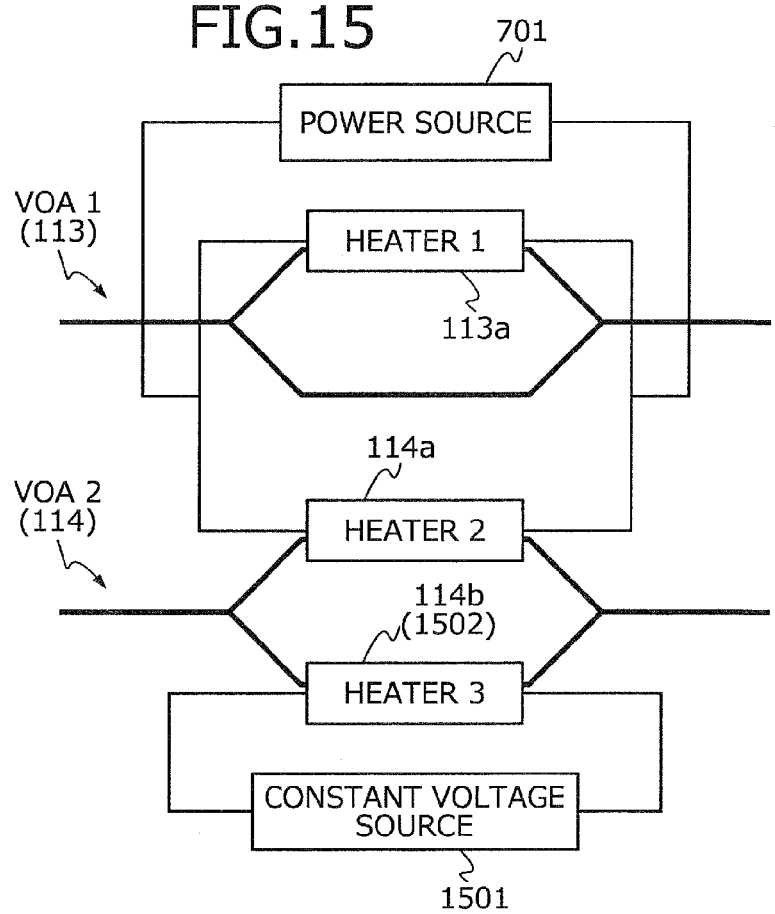
FIG. 15 is a diagram depicting a structural example for correcting an attenuation difference of the two VOAs in a case of specification of 1 variable power source.

FIG. 15 is a diagram depicting a structural example for correcting an attenuation difference of the two VOAs in a case of specification of 1 variable power source. When the one variable voltage source 701 is used to perform the same control on the two VOAs 113, 114, if a difference in attenuation occurs between the two VOAs 113, 114 consequent to arm waveguide error, a correction to the heater 113a of the VOA 113 (or the heater 114a of the VOA 114) is added and the attenuation has to be made to coincide with that of the other VOA 114 (or the VOA 113).

Further, constant voltage from a constant voltage source 1501 that is separate from the variable voltage source 701 used for adjusting attenuation is applied to a thin film heater 114a, 114b of one arm waveguide of the VOA 114 on the side to which correction is added. In the example depicted in FIG. 15, constant voltage from the constant voltage source 1501 is applied to the thin film heater 114b.

When the constant voltage source 1501 is used to supply power to the thin film heaters 113a, 114a used for optical attenuation, correction to increase attenuation is performed.

On the other hand, when the constant voltage source 1501 is used to supply power to the thin film heater 114*b* of an arm waveguide other than those of the thin film heaters 113*a*, 114*a* used for optical attenuation, correction to decrease attenuation is performed. As depicted in FIG. 15, the constant voltage source 1501 supplies power to the thin film heater 114*b* of the arm waveguide on the opposite side and is advantageous in that electrical noise is suppressed by performing correction.

By using the constant voltage source 1501 to supply to the thin film heater 114*a* of the VOA 114 on the side to be corrected, constant power corresponding to an attenuation difference between the two VOAs 113, 114, the attenuation between the two VOAs 113, 114 can be made to coincide. The thin film heater 114*b* used in this correction will be called an offset bias thin film heater 1502.

The constant voltage source 1501, for example, can reduce the constant voltage supplied to the optical receiver circuit 100, to the voltage required for correction. 1) and 2) below may be considered as ways to adjust the voltage from the constant voltage source 1501 to a required value.

1) Insert a resistor between the constant voltage source 1501 and the offset bias thin film heater 1502.
2) Insert a linear regulator and a resistor between the constant voltage source 1501 and the offset bias thin film heater 1502.

The inserted resistor, similar to the corrective resistor 1001 used in "Correction of 1. Thin film heater resistance error" above, can use a chip resistor by a thin film resistor process. In the example of 1), although the circuit structure as the advantage of being simple, if the voltage of the constant voltage source 1501 deviates, the voltage applied to the offset bias thin film heater 1502 also deviates. In the example of 2), although the circuit structure becomes more complicated by the use of the regulator, deviations in the voltage applied to the offset bias thin film heater 1502 are very small consequent to the voltage stability of the regulator. For example, when the deviation of the voltage supplied to the constant voltage source 1501 is 3.3V, in the example 1), the voltage applied to the offset bias thin film heater 1502 also has a 10% deviation. In contrast, in the example of 2), by using the regulator having output voltage accuracy on the order of 1 to 2%, voltage deviation can be suppressed to about $1/10$ to $1/5$ of that in the example of 1).

In a third example, the second structural example (refer to FIG. 3) is controlled by the specification of 1 variable power source (refer to FIG. 7). In the third example, among the components of the signal light split by the PBS 111 and input to the two VOAs 113, 114, one component is input as a TE wave and the other is input as a TM wave. In this case, to use the single variable voltage source 701 (FIG. 7) to perform the same control on the two VOAs 113, 114 2 and make the attenuation of the respective signal light components coincide, the two VOAs 113, 114 are designed and fabricated to satisfy equation (3) at the same voltage. Similar to the configuration for the specification of 1 variable power source described in the second example, at the time of discrete fabrication of the optical receiver circuit 100, attenuation difference correction for two types of fabrication differences (1. Thin film heater resistance error and 2. Optical path length error of arm waveguide) is performed.

In a fourth example, the second structural example (refer to FIG. 3) is controlled by the specification of 2 variable power sources (refer to FIG. 6). In the fourth example, among the components of the signal light split by the PBS 111 and input to the two VOAs 113, 114, one component is input as a TE wave and the other is input as a TM wave. The voltage respectively applied to the VOAs 113, 114 is independently adjusted by the two variable voltage sources 601, 602 to make the attenuation of the two components of the split signal light coincide.

Figure 16:
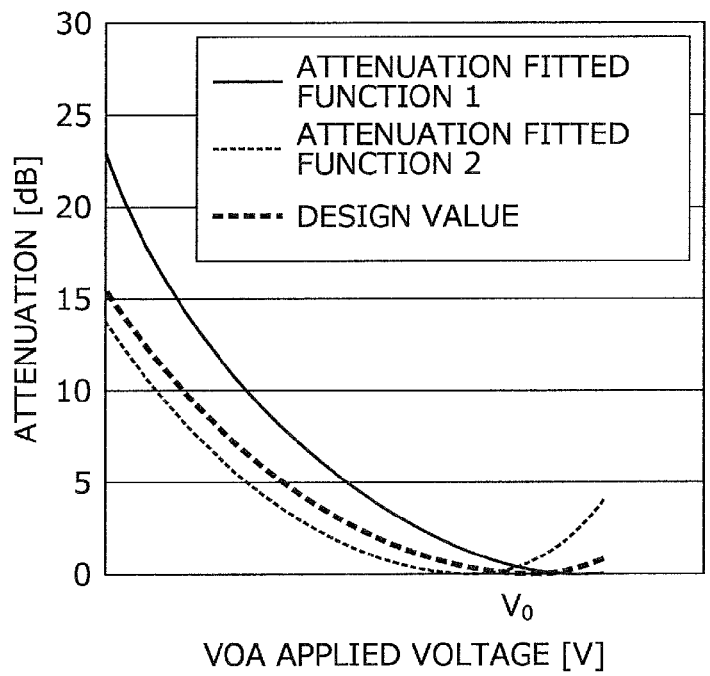
FIG. 16 is a graph depicting attenuation characteristics consequent to resistance error of the thin film heaters and optical path length error.

FIG. 16 is a graph depicting attenuation characteristics consequent to resistance error of the thin film heaters and optical path length error. Design values are indicated by a thick dashed line. Further, attenuation characteristics of the two components of the split signal light are depicted for cases where the two VOAs have a mutual optical path length difference of 10% and the resistance of the thin film heaters of the two VOAs have a +20% error (dotted line in the figure) and a −20% error (solid line in the figure).

Figure 17:
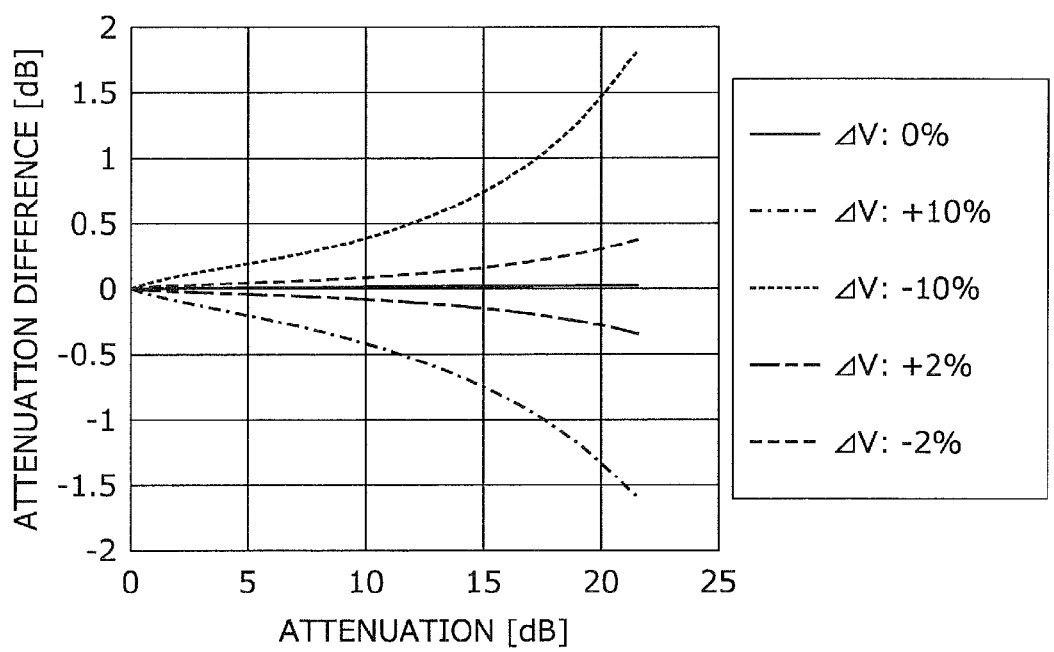
FIG. 17 is a graph depicting attenuation differences of two components of signal light when correction for the resistance error and the arm-waveguide optical path length error depicted in FIG. 16 is performed.

FIG. 17 is a graph depicting attenuation differences of the two components of signal light when correction for the resistance error and the arm-waveguide optical path length error depicted in FIG. 16 is performed. The horizontal axis represents attenuation and the vertical axis represents the difference of attenuation of the two VOAs. A center value line indicates a case when deviation of the voltage applied to the offset bias thin film heater 1502 is 0.

Characterizing curves when the attenuation difference is +2%, −2% represent cases where a resistor and a regulator with 2% accuracy are inserted between the constant voltage source 1501 and the offset bias thin film heater 1502 (for example, refer to FIG. 15). The characterizing curves when the attenuation difference is +10%, −10% represent cases where a resistor is inserted between the constant voltage source 1501 and the offset bias thin film heater 1502. In this manner, by inserting a linear regulator and a resistor between the constant voltage source 1501 and the offset bias thin film heater 1502, rather than a resistor alone, deviations in the voltage applied to the offset bias thin film heater 1502 can be made very small.

As described, components of signal light that has been polarization split by the polarization beam splitter (PBS) of the optical demodulation circuit can be attenuated respectively by the two variable optical attenuators (VOA) and output. The first structural example that uses the half-wave plate (rotator) to made the polarization state of the signal light input to the two VOAs coincide or the second structural example in which the half-wave plate (rotator) is disposed on the local light (Lo) side can be used. Concerning attenuation control for the two VOAs, both the first and the second structural example enable selection and combination of a single power application (specification of 1 variable power source) or two independent power applications (specification of 2 variable power sources).

When VOA control is be the specification of 1 variable power source, VOA design can be symmetrical or asymmetrical. In the case of symmetrical design, by correcting thin film heater resistance error and optical path length error of the arm waveguides (VOA fabrication differences), the attenuation of the two VOAs can be precisely controlled. In the case of asymmetrical design, to make the attenuation of the two polarized waves (TM wave, TE wave) coincide, a structure is adopted that changes the optical path length of the arm waveguide of the VOA. By respectively correcting thin film heater resistance error and optical path length error of the arm waveguides (VOA fabrication differences), the attenuation of the two VOAs can be precisely controlled.

According to the embodiment, the polarization beam splitter (PBS), the half-wave plate (rotator), the two variable optical attenuators (VOAs), the 3 dB coupler, and the two 90-degree hybrid circuits forming the optical receiver circuit are disposed on a single PLC substrate. In this manner, the variable optical attenuator function by a VOA is integrated on the PLC, enabling output of differing polarization states to be attenuated and output, and enabling the optical receiver circuit to be fabricated to be compact, having high precision and a low cost. In particular, in a scheme used in the output of two split light waves such as DP-QPSK, etc., PDL can be suppressed.

In the embodiment, to suppress attenuation differences of the two polarized waves (TM wave, TE wave) caused by PDL, two VOAs are disposed on the PCL and for these two VOAs, heater resistance error and arm waveguide fabrication differences of the VOAs are respectively corrected. As a result, without relying on the precision of the design of the PLC main body, attenuation differences of the two VOAs can be eliminated.

According to one embodiment, components of polarization split signal light can be respectively output without a difference in attenuation caused by polarization dependent loss and a variable optical attenuator function can be integrated on a planar optical waveguide.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical receiver circuit comprising:
    a polarization beam splitter configured to split input signal light into two different polarized wave components;
    two variable optical attenuators configured to respectively adjust attenuation of and output the signal light split by the polarization beam splitter according to polarization state; and
    a single planar optical waveguide on which the polarization beam splitter and the two variable optical attenuators are disposed
    a splitter-coupler configured to split input local light;
    a half-wave plate disposed between the polarization beam splitter and one of the two variable optical attenuators, and configured to make the polarization state of a first component of the signal light split by the polarization beam splitter to coincide with the polarization state of a second component of the signal light; and
    two 90-degree hybrid circuits each configured to receive a respective input of the local light split by the splitter-coupler and an optical signal for which attenuation has been adjusted by a respective one of the two variable optical attenuators.

2. The optical receiver circuit according to claim 1, further comprising
    a single variable voltage source that supplies equivalent voltage to the two variable optical attenuators to cause attenuation of the signal light.

3. The optical receiver circuit according to claim 2, wherein
    the two variable optical attenuators have arm waveguides of differing optical path lengths and correct a difference in attenuation of the signal light of different polarization states.

4. The optical receiver circuit according to claim 3, wherein
    the arm waveguides of the two variable optical attenuators have differing arm waveguide widths, or refractive indices.

5. The optical receiver circuit according to claim 2, wherein
    a corrective resistor is disposed between the variable voltage source and the two variable optical attenuators to correct with respect to applied voltage, a difference in attenuation of the two variable optical attenuators caused by a fabrication difference of resistance of thin film heaters disposed in the two variable optical attenuators.

6. The optical receiver circuit according to claim 2, further comprising
    a constant voltage source to correct with respect to applied voltage of the variable voltage source, a difference in attenuation caused by a fabrication difference of arm waveguides of the two variable optical attenuators, the constant voltage source being configured to supply constant voltage to a thin film heater for an arm waveguide, among thin film heaters disposed on two arm waveguides of the two variable optical attenuators.

7. The optical receiver circuit according to claim 1, further comprising
    two variable voltage sources configured to supply voltage to the two variable optical attenuators, respectively, to attenuate the signal light.

8. The optical receiver circuit according to claim 7, further comprising
    control circuitry configured to detect a level of the signal light after attenuation by the two variable optical attenuators and control attenuation of the two variable optical attenuators.

9. An optical receiver circuit comprising:
    a polarization beam splitter configured to split input signal light into two different polarized wave components;
    two variable optical attenuators configured to respectively adjust attenuation of and output the signal light split by the polarization beam splitter according to polarization state; and
    a single planar optical waveguide on which the polarization beam splitter and the two variable optical attenuators are disposed
    a splitter-coupler configured to split input local light;
    a half-wave plate configured to change the polarization state of a first component of the signal light split by the splitter-coupler; and
    two 90-degree hybrid circuits each configured to receive a respective input of the local light split by the splitter-coupler and an optical signal for which attenuation has been adjusted by a respective one of the two variable optical attenuators.

* * * * *